United States Patent [19]

Priestly et al.

[11] 4,356,926

[45] Nov. 2, 1982

[54] METHOD OF BONDING PLASTIC TO METAL AND CONTAINER FORMED THEREBY

[76] Inventors: William J. Priestly, Rte. 2, Box 6, Shelby, N.C. 28150; Nelson E. McLoughlin, 8517 Old Concord Rd., Newell,, N.C. 28126

[21] Appl. No.: 78,180

[22] Filed: Mar. 19, 1980

[51] Int. Cl.³ .............................................. B65D 8/04
[52] U.S. Cl. ..................................... 220/67; 156/73.1; 215/1 C; 220/85 SP; 264/23; 264/268; 264/274
[58] Field of Search ......................... 264/23, 268, 274; 29/460, 469.5; 156/73.1, 73.4; 220/67, 85 SP; 215/1 C

[56] References Cited

U.S. PATENT DOCUMENTS

| | | | |
|---|---|---|---|
| 3,022,814 | 2/1962 | Bodine Jr. | 264/23 |
| 3,440,117 | 4/1969 | Soloff et al. | 264/23 |
| 3,499,808 | 3/1970 | Obeda | 156/73.1 |
| 3,773,205 | 11/1973 | Keeler et al. | 156/73.1 |
| 4,106,962 | 8/1978 | Adams et al. | 156/73.1 |
| 4,259,419 | 3/1981 | Uba et al. | 264/23 |

*Primary Examiner*—Donald E. Czaja
*Assistant Examiner*—W. Thompson
*Attorney, Agent, or Firm*—LeBlanc, Nolan, Shur & Nies

[57] ABSTRACT

A method of bonding metal to plastic by application of ultrasonic energy alone or by insert injection molding or by a simultaneous application of ultrasonic energy during insert injection molding. A container made by the process, particularly a beverage container.

5 Claims, 4 Drawing Figures

METHOD OF BONDING PLASTIC TO METAL AND CONTAINER FORMED THEREBY

BACKGROUND OF THE INVENTION

The invention relates generally to techniques of bonding dissimilar materials together and more particularly to processes for joining plastic to metal and the product formed thereby.

The use of ultrasonic energy for bonding metals together has been known for years. Similarly, insert injection molding techniques for forming containers and other items from a single, homogenous starting plastic material are known.

What is not known and has not been done before is successfully bonding a plastic material, such as polyethylene or an ABS resin, to a metal such as aluminum or steel.

The novel process disclosed and claimed herein has particular application to the manufacture of beverage containers and, more generally, containers for a wide variety of liquids. Currently, containers for beverages such as soft drinks, beer and ale are made from glass only, metal only or plastic only. Each container has its own attendant advantages and disadvantages. For example, glass containers are rather sturdy and can be sterilized for reuse but are fragile, rather easily broken and weigh considerably more than plastic or metal containers. The weight factor causes considerable added costs in shipping and handling. Metal containers made of steel and aluminum are lighter in weight and are more readily chilled than glass containers. However, they cannot be reused without recycling of the containers into basic metal and reforming of the metal into a new container. Nevertheless, the economics are such that, given the popularity of metal containers and the increasing use of recycling of such containers due to energy conservation and short supply of raw material factors, particularly those made from aluminum, into new containers, the marketing of beverages in metal cans is most successful.

More recently, plastic beverage bottles or containers have appeared in the market place and have enjoyed rather widespread popularity. For example, plastic containers have screw-off caps over a small neck opening which makes the container easier to drink from and more sanitary. Conversely, metal containers, particularly those made from aluminum, have tops that are difficult to open and somewhat dangerous to use in that the opened top leaves a sharp, exposed edge that may cut the lip or mouth of the user. Plastic containers can be recycled into new beverage containers with a recovery factor of about 25% of the starting material. Aluminum is recycled more efficiently, however, in that about 65% of the starting material may be recovered.

A singular and significant disadvantage of plastic only containers is that they may explode when stored at elevated temperatures. By elevated temperatures we mean as low as 85° to 90° F.

Accordingly, significant advantages are obtained by the present invention wherein plastic and metal are successfully bonded together and a useful product is obtained thereby. Specifically, we disclose a beverage container made of aluminum and plastic which has the best features of aluminum only and plastic only containers. In a preferred embodiment, the beverage container has an aluminum base with a plastic top joined thereto having a screw-off cap. The container is thus safer to use than a plastic container because it will not explode and safer to use than a metal container because it has the sanitary and safety advantages of either all glass or all plastic containers.

Most significantly, the recycling recovery rate of the aluminum-plastic beverage container of this invention is almost as great as that of an all aluminum container. Specifically, the aluminum base is 65% recoverable while the plastic top is 25% recoverable. Present day recycling centers and plants may be used because the plastic and metal components are very easily dissociated and separately recovered in the recycling process.

SUMMARY OF THE INVENTION

Accordingly, it is a principal object of the invention to bond metal and plastic together and thereby create a useful product such as a beverage container.

It is another object of the invention to bond metal to plastic using ultrasonic energy at a frequency of from 20 to 40 KHz, an insert injection molding process employing pressures of from 8,000 to 12,000 psi, or a simultaneous combination of both processes.

It is a further object of the invention to produce a metal and plastic beverage container which is safe to use, will enjoy widespread popularity and is recyclable with a significant recovery percentage.

Generally, the invention disclosed herein is a process for bonding metal, such as aluminum or steel, to a plastic, preferably polyethylene or an ABS resin, using ultrasonic energy at a frequency of from 20 to 40 KHz to cause sufficient molecular interaction and migration at the interface of the materials to cause the same to bond together. A leakproof container such as a beverage container having a metal base and a plastic top may be made thereby. Alternatively, a container may be made by insert injection molding of a plastic top onto a preform metal base.

BRIEF DESCRIPTION OF THE DRAWINGS

Further objects and advantages of the invention will become readily apparent by reference to the following detailed specification and drawings in which.

DESCRIPTION OF THE PREFERRED EMBODIMENTS

Figure 1:
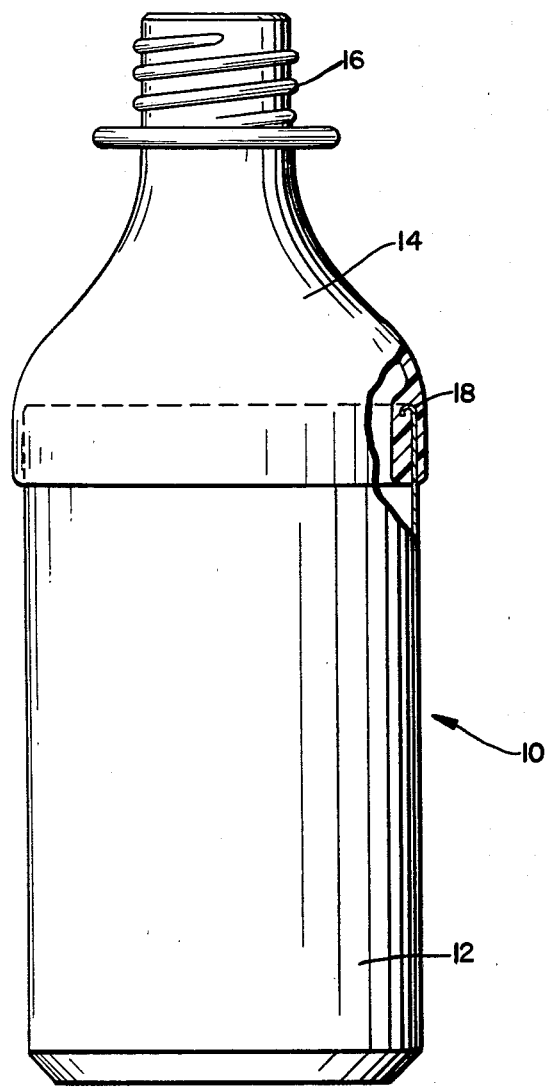
FIG. 1 is an elevation view of a beverage container having a metal base and a plastic top, drawn partly in section to show the interface of the plastic top with the metal base.

Referring now to the drawings by reference character, a container or beverage bottle 10 is illustrated in FIG. 1 having an aluminum base 12 and a plastic top 14, formed with a reduced neck upper opening conventionally threaded at 16 to receive a standard screw-off cap (not shown). Aluminum base 12 (which could be made of steel) has a wall diameter the same as that of conventional all aluminum beverage cans, that being on the order of 0.002 to 0.005 inches.

Plastic top 14 may be made from a wide variety of plastic materials but, preferably, is made from polyethylene or an ABS resin.

Figure 2:
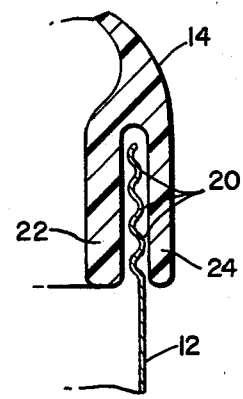
FIG. 2 is an enlarged, partial section view showing disposition of metal and plastic edges prior to the bonding process.
Figure 3:
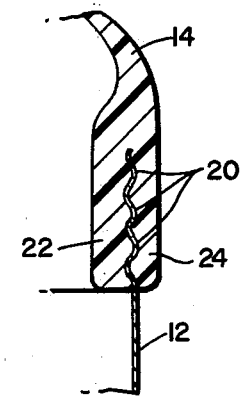
FIG. 3 is a view similar to FIG. 2 showing parts after bonding.
Figure 4:
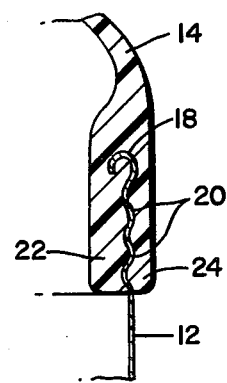
FIG. 4 is a view similar to FIG. 3 showing another embodiment of the invention.

To assist in assuring a secure interface of plastic to metal, the upper open top of the cylindrical can or metal preform 12 is circumferentially lipped as shown at 18 in FIG. 1 into a portion having a C-configuration in cross-section. Alternatively, the top or rim may be circumferentially corrugated as at 20 as illustrated in FIGS. 2 and 3. Or, the top may be both circumferentially corrugated and lipped as disclosed at 18, 20 in FIG. 4.

The lower peripheral skirt edge of plastic top 14 is circumferentially thickened and bifurcated into two segments 22, 24, inner segment 22 being slightly greater in wall diameter than outer segment 24 so that the container will not collapse during the forming process as will be explained below.

In one preferred embodiment of the invention, plastic top 14 and metal base 12 are preformed as separate components. Top 14 is then placed over base 12 so that segments 22, 24 sandwich the upper top of can 12, as is illustrated in FIG. 2. Thereafter, ultrasonic energy is applied by an ultrasonic horn (not shown) evenly, externally and circumferentially about the junction of top 14 and base 12, at a frequency of about 20 to 40 KHz. Ultrasonic energy is applied in an even and balanced manner to prevent deformation or collapse of the container during its formation. The resultant pressure, about 6K psi or so, results in sufficient atomic movement in both plastic and metal components to assure a firm, leakproof ultrasonic weld of the two materials.

Alternatively, an insert injection molding process may be employed wherein the base 12 is preformed but top 14 is made during the insert injection molding process. At a pressure of from 8K to 12K psi, sufficient heat and pressure are created to assure an even, continuous and leakproof bond of plastic and metal together.

In yet another embodiment of the invention, both ultrasonic energy and insert injection molding may be used at the frequencies and pressures, respectively, hereinbefore specified, application of both techniques being simultaneous so that the container is formed without need of an extra manufacturing step.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of forming a complete container having a metal base and a plastic top comprising the steps of: making a metal, open topped, closed bottom, cylindrical container preform; and forming a plastic top thereon by insert injection molding under a pressure of from 8,000 to 12,000 psi.

2. The method of claim 1 wherein the open top of the preform is deformed into an uneven surface, the uneven surface being corrugated and curved at its upper terminus into a lip portion having a C configuration in cross-section.

3. The method of claim 1 comprising the further step of applying ultrasonic energy at a frequency in the range of from 20 to 40 KHz at the junction of the top with the preform, evenly thereabout and simultaneously with the insert injection molding step.

4. The method of claim 1 wherein the preform is made of a metal selected from the group consisting of aluminum and steel and the top is made of a plastic selected from the group consisting of polyethylene and ABS resin.

5. The product formed by the process of claim 1.

* * * * *